Aug. 15, 1933.          C. M. STITH          1,922,986
WIND BOARD
Filed Nov. 10, 1931
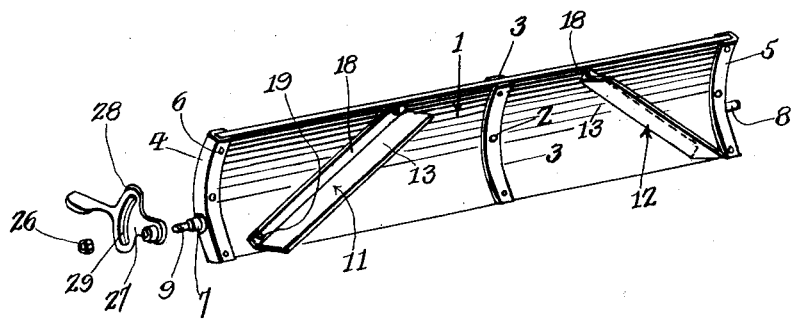
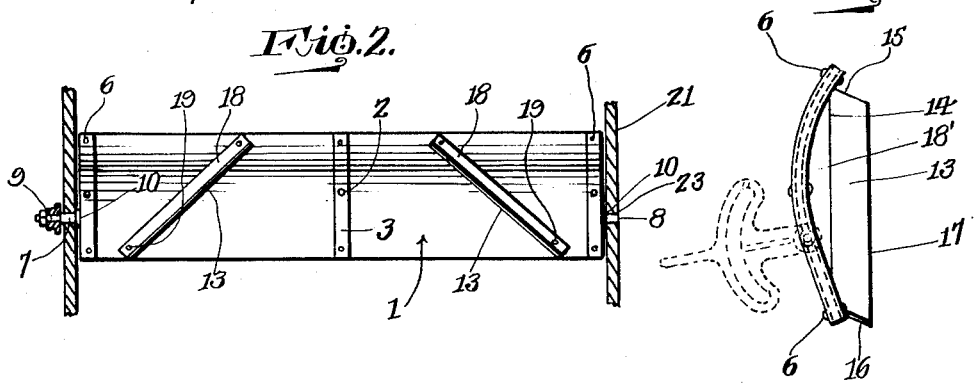
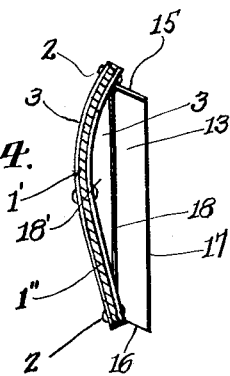
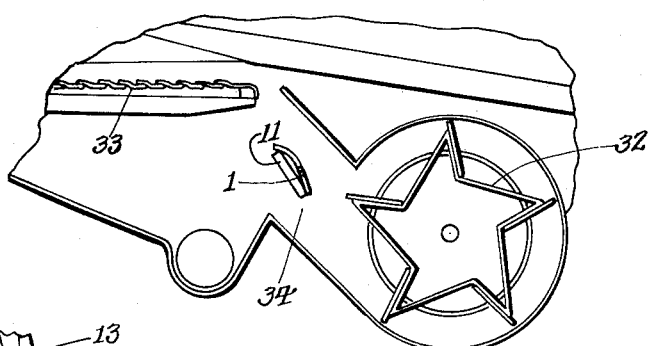
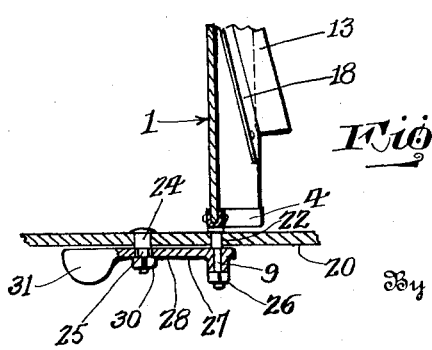
Inventor
Charles M. Stith
By Geo. P. Kimmel
Attorney Patented Aug. 15, 1933

1,922,986

UNITED STATES PATENT OFFICE 1,922,986

WIND BOARD

Charles M. Stith, Liberal, Kans.

Application November 10, 1931
Serial No. 574,187

7 Claims. (Cl. 209—363)

My invention relates to a wind board designed primarily for use in connection with combines or threshing machines for wheat and small grain, but its use is also applicable to gleaners, cleaners, fan mills and such other machines or devices as may be used for threshing and cleaning beans, rice and all forms of grains or solid vegetables where a wind board is employed.

It is well known that the wind from the fans in combines and threshing machines now in general use causes a non-circulating or dead air space from a center point at the fan, over, toward and across the chaffer directly from the center of the fan thereby causing the chaff and grain to pile up on the chaffer as the wind is not properly distributed. The wind on either side of the chaffer had a tendency to pile and bunch the grain and chaff from one end of the chaffer to the other in an accumulated mass of V-form by reason of the fact that the wind on either side of the chaffer moves such accumulation and with the movement of the latter retarded at the center of the chaffer, as the wind being of greater strength on either side. To overcome the foregoing objectionable features is one of the aims of my invention, and which is attained by providing for a proper distribution of the wind with respect to the chaffer.

In cutting grain, it is well known that all grain is not even. There are thick spots and thin spots in every field of every kind of grain. When hitting the thick spots, the engine of the combine and other grain or vegetable machines will cause the engine to flutter, or choke down, and of course, this is controlled somewhat by the governor on the engines; and, ordinarily, in a number of instances with the present form of threshing, separator and gleaner machines, a large amount of grain will be thrown over if the engine is not slowed down or regulated when the thin spots and thick spots are encountered in cutting. It is not always easy to control this by regulating the speed of the engine. The rise and lowering of the machine, or fluctuation of the speed, and the defects in perfecting control and handling of thick and thin spots of the grain is taken care of by the insertion and use of a wind board in accordance with my invention, because it will control the center air section from the fan and automatically controls the fluctuation of the grain and takes care of the fluctuation of the machine, so that regardless of thick and thin spots in the field, and regardless of the speed of the engine, the use of my form of wind board in connection with the fan, equalizes the handling of the straw and grain regardless of the quantity and regardless of the fluctuation and regardless of the speed of the engine whether in thick or thin grain. If this control did not exist by the use of my form of wind board, the grain and straw would congest and climb up and over on the riddles and it would fluctuate causing thin and thick spots in and on the riddles according to the fluctuating of the machine and the thin and thick spots cut by the combine.

The essential objects of my invention are to ensure, for the proper separation of the threshed grain and for the proper use of the chaffer of a threshing machine to separate the grain to avoid muddling, piling up, bunching, concentration and waste; to control the wind and to regulate and divert the wind from the fan in such a manner that the wind is equally distributed, under, over, in and through the chaffer to bring about an equal distribution of the wind upon the threshed grain and the chaff, thus causing perfect separation of the grain from the chaff on the chaffer thereby resulting in a material saving of grain; to control and regulate the wind from the fan up to, over, under and upon the chaffer resulting in spreading the chaff and separating the grain and the excluding the chaff and waste material from the chaffer board without throwing over quantities of grain and causing waste; and to attain these ends in a strong, durable, compact, adjustable and inexpensive structure.

To the above ends essentially my invention consists in such parts and in such combination of parts as fall within the scope of the invention as claimed.

In the drawing:

Figure 1 is a perspective view looking towards one side of a wind board in accordance with my invention and with the adjusting lever disconnected from the body of the board.

Figure 2 is an elevation looking towards one side of the wind board and with the latter shown as being pivotally supported by the body of the machine in which the board is installed.

Figure 3 is an end view of the board and further showing in dotted lines the adjusting lever.

Figure 4 is a transverse section of the board.

Figure 5 is a fragmentary view of a threshing machine illustrating, by way of example a wind board, in accordance with my invention installed with respect to an under shot fan and a chaffer.

Figure 6 is a fragmentary view, in sectional plan of the wind board supported by a side of the machine, in which the board is installed and further showing the latching means for the adjusting lever to maintain the board in set position.

A wind board in accordance with my invention includes a rectangular body part 1, which in transverse cross section is of concavo-convex contour as at 1' and inclined as at 1''. The body part 1 is formed of any suitable material of the desired thickness. The body part 1, at its transverse median has fixedly secured to each side thereof, by the spaced holdfast means 2 a reinforcing strap 3 conforming in curvature to and having its ends flush with the lengthwise edges of body part 1.

The body part 1 is reinforced at each end by an inwardly extending channel shaped member of arcuate contour. The said members are indicated at 4, 5 and are oppositely disposed. Each member overlaps one end marginal portion of each of the sides and has its ends flush with the lengthwise edges of body part 1. The members 4, 5 are anchored in position by the holdfast means 6. The members 4, 5 having extending laterally therefrom a pair of stub shafts or pivots 7, 8 respectively, the former being of greater length than the latter and having a reduced outer peripherally threaded portion 9. The shafts or pivots 7, 8 are formed with peripheral shoulders 10 at their inner ends.

The concave side of body part 1 has positioned thereagainst a pair of oppositely disposed deflectors or vanes 11 and 12 of like form and each of which consists of a plate 13 directed outwardly from body part 1, and formed with a lengthwise extending inner side edge 14 seated at its ends against the concaved portion and inclined portion of body part 1 and has that part thereof between its ends spaced from body part 1 forming an opening 18', an upper squared end edge 15, a lower squared end edge 16, an outer lengthwise extending squared edge 17 and a flange 18 extending lengthwise of plate 13, formed integral with the latter and flush with edge 14. Holdfast means 19 are employed at the ends of the flanges 18 for securing the deflectors or vanes to body part 1. The flanges 18 are spaced in the same manner as edge 14 is spaced from body part 1.

The deflectors or vanes are disposed in opposite directions with respect to each other, and diagonally with respect to the concave side of body part 1 and form a V-passage. Each deflector or vane inclines inwardly from the lower to its upper end.

The wind board is adjustably supported from the sides 20, 21 of the machine in which it is installed. The wall 20 has an opening 22 through which shaft 7 extends. The wall 21 has an opening 23 in which is mounted shaft 8. Secured to wall 20 adjacent opening 22 is an outwardly extending bolt 24 having a reduced threaded portion 25. Clamped upon the portion 9 of the shaft 8, by a nut 26 is one end of a lever 27, formed with an intermediate portion 28 extending laterally in opposite directions and provided with an arcuate slot 29. The reduced portion 25 of bolt 24 is extended through slot 29 and carries a nut 30 which is adapted to be clamped against the portion 28 to detachably secure lever 27 in its adjusted position. The handle part of lever 27 is indicated at 31.

An under shot fan is indicated at 32 and a chaffer at 33. The wind board is adjustably supported between the fan 32 and chaffer 33 in the wind conducting passage 34. The wind board is arranged below the chaffer 33 and spaced from the left of the fan 32.

A wind board in accordance with my invention may be employed in connection with an under shot fan or with an over shot fan.

With respect to the use of the wind board in connection with an under shot fan, it will be assumed that the wind board has been adjusted so as to cause the air from the fan to come under the lower part of the wind board, and owing to the concaved and convex shape of the latter and the vanes or deflectors, the air will be diverted under, over, in and through the chaffer.

When the wind board is employed in connection with an over shot fan, it is reversed, end for end so that the top of the V provided by the deflectors or vanes will divert the air in the same manner as when the board is employed in connection with an under shot fan. It is to be borne in mind that the overshot fan throws the air in an opposite direction from that of the under shot fan and for the same purpose of having the air reach the chaffer, but in most of the over shot fan machines, the position of the wind board is set a little higher and more directly in the center of the fan, but the installation of a wind board, in accordance with my invention, is such that the wind will be controlled in the desired manner to attain the result desired.

The wind board, in accordance with my invention, is so formed that it causes a portion of the air to travel directly thereover to the chaffer, other portions of the air are diverted and crowded, by the channel provided by the deflectors towards the center of the board and diverted across from said center to the chaffer, while another portion of the air that is split and separated goes under the deflectors and fills the space between the center of the chaffer and the sides of the latter, thus making an equal distribution of air, over, through, across and under the chaffer from the fan, and which aids in the cleaning of the grain, the saving of grain and increase the volume and capacity of chaffers in caring for the grain.

It is essential that the spacing be proportioned according to the volume of air and according to the size of the chaffers, and in proportion to the wind board, so that an equal distribution and control of the air may be had from any machine in which the wind board is installed.

What I claim is:—

1. A wind board comprisng a concavo-convex body part, a pair of spaced oppositely extending deflectors secured against, extending from and diagonally disposed with respect to the concaved side of said body part, said body part being of rectangular contour, a shaft at each end of said body part, a slotted adjusting lever for said body part clamped to one of said shafts, and means coacting with the slot of said lever for maintaining said body part in adjusted position.

2. A wind board comprising, an adjustable, rectangular, concavo-convex body, and a pair of deflectors secured to the concaved side of said body, spaced from each other, extending at right angles to said side, spaced from each other and inclining inwardly towards each other.

3. A wind board comprising a concavo-convex body part, a pair of spaced oppositely extending deflectors secured against, extending from and diagonally disposed with respect to the concaved side of said body part, said body part being of rectangular contour, a shaft at each end of said body part, a slotted adjusting lever for said body part clamped to one of said shafts, means coacting with the slot of said lever for maintaining said body part in adjusted position, and reinforcements for the center and each end of said body part disposed transversely of each side of the latter.

4. A wind board including a rectangular body part having a concaved side, and a pair of spaced, oppositely disposed deflectors secured at their ends to and diagonally disposed with respect to said side, each deflector being arranged between one end and the transverse median of said body part, the major portion of said deflectors being spaced from said side.

5. A wind board including a rectangular body part having a portion of concavo-convex contour and an inclined portion merging into said other portion, reinforcing means of the same contour as and extending transversely of said body part at the transverse center of the latter, reinforcing means of the same contour as and extending transversely of said body part at each end of the latter, a shaft extending from each end reinforcing means for pivotally supporting said body part, an adjusting lever clamped to one of said shafts and formed with a horizontally disposed arcuate slot for the passage of means to secure the lever in adjusted position, and a pair of oppositely disposed deflectors secured at their ends to and arranged diagonally of the concaved side of the body part, said deflectors being spaced from the central and end reinforcing means and having the major portion thereof spaced from said body part.

6. A wind board including a rectangular body part having a portion of concavo-convex contour transversely and an inclined portion merging into said other portion, said portions corresponding in length to that of the body part, and a pair of spaced deflectors disposed at opposite inclinations with respect to the concaved side of the concavo-convex portion, extending outwardly at an angle to said body part, extending from the outer edge of one portion to the outer edge of the other of said portions, secured at their ends to and being spaced between their ends from said body part.

7. A wind board comprising a body part, means upon one side of and spaced from the ends of the latter to provide a substantially V-shaped air conducting channel, said body part in transverse section being substantially of concavo-convex contour, and said means being located on the concaved side of said body part, said means being spaced from the ends of said body portion and further having the major portion thereof spaced from said side.

CHARLES M. STITH.